W. V. TURNER.
TRIPLE VALVE TEST RACK.
APPLICATION FILED JAN. 19, 1916.
1,297,508.
Patented Mar. 18, 1919.
2 SHEETS—SHEET 1.
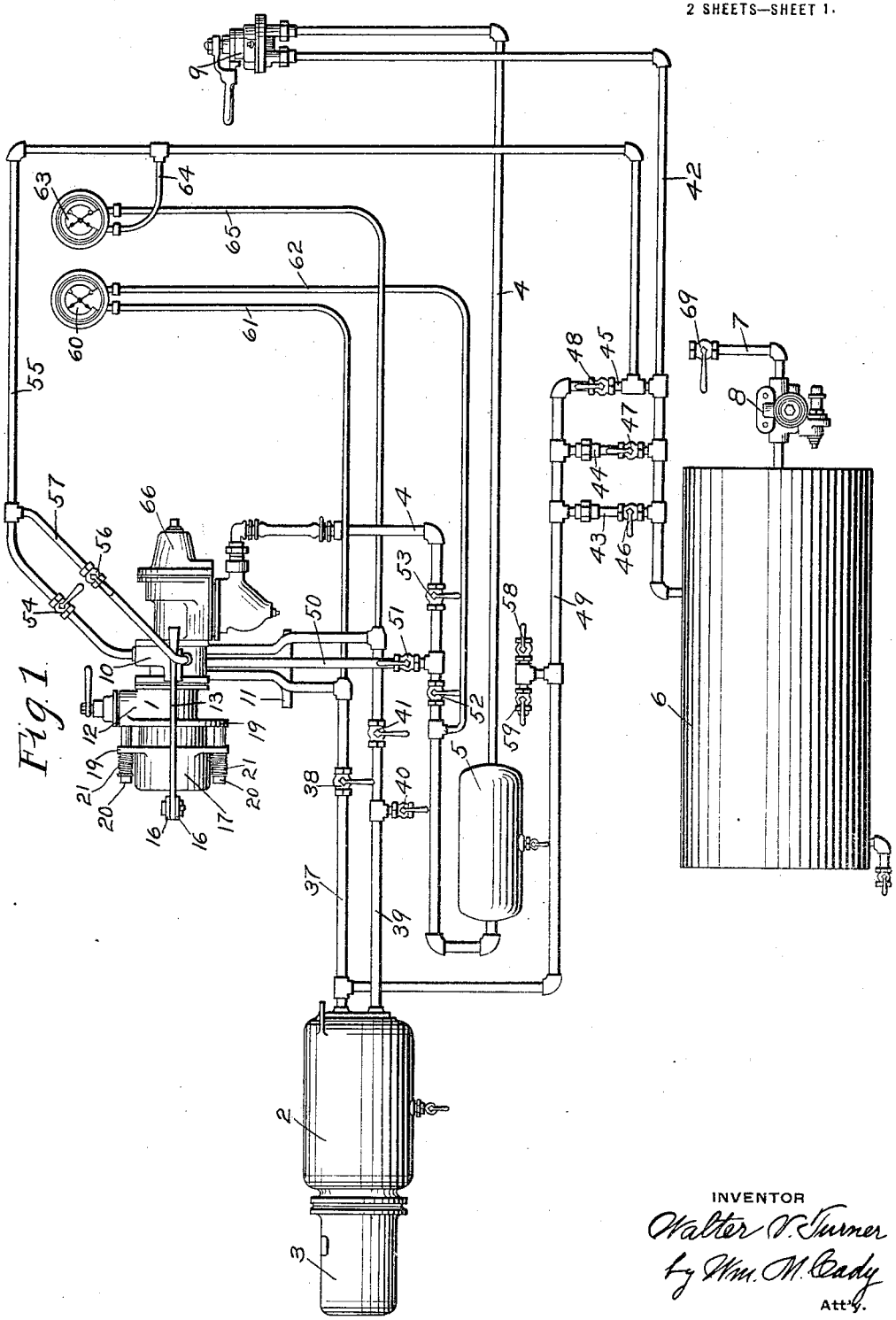
INVENTOR
Walter V. Turner
by Wm. M. Cady
Att'y.

W. V. TURNER.
TRIPLE VALVE TEST RACK.
APPLICATION FILED JAN. 19, 1916.
1,297,508.
Patented Mar. 18, 1919.
2 SHEETS—SHEET 2.
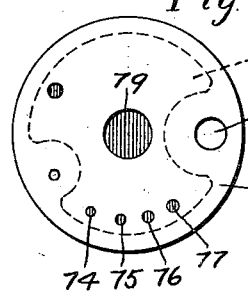
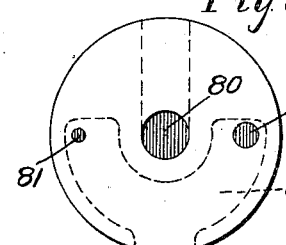
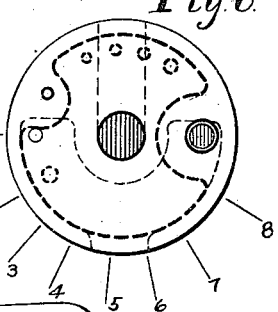
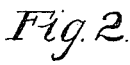
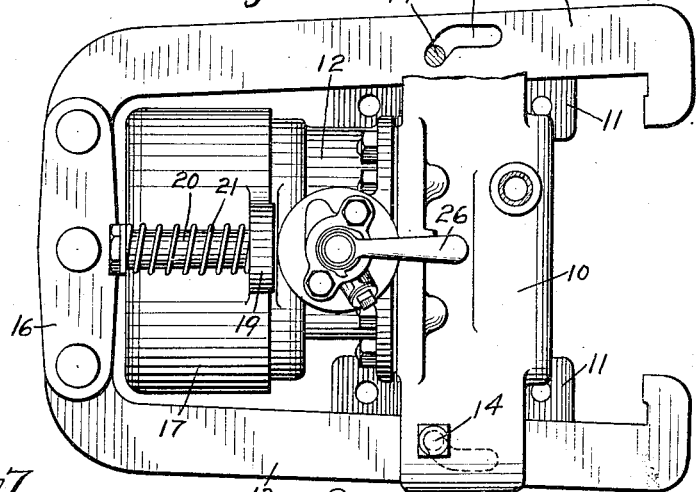
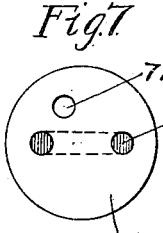
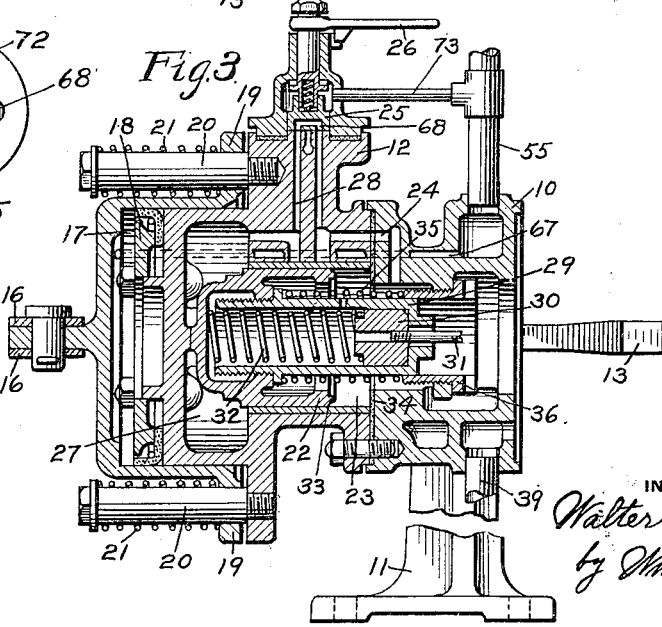
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

TRIPLE-VALVE TEST-RACK.

1,297,508.              Specification of Letters Patent.      Patented Mar. 18, 1919.

Application filed January 19, 1916. Serial No. 72,941.

*To all whom it may concern:*

Be it known that I, WALTER V. TURNER, a citizen of the United States, residing at Wilkinsburg, in the county of Allegheny and State of Pennsylvania, have invented new and useful Improvements in Triple-Valve Test-Racks, of which the following is a specification.

This invention relates to testing devices, and more particularly to an apparatus for testing triple or other valve devices employed in controlling fluid pressure brakes on trains.

The principal object of my invention is to provide an improved construction of the above character.

In the accompanying drawings, Figure 1 is a diagrammatic view of a triple valve test apparatus embodying my improvements; Fig. 2 a plan view of the stand for holding the triple valve device in position for testing; Fig. 3 a central vertical section thereof; Fig. 4 a face view of the rotary valve of the brake valve; Fig. 5 a plan view of the rotary valve seat; Fig. 6 a view showing the different operating positions of the rotary valve, with respect to the seat; and Fig. 7 a face view of the rotary valve employed in the stand.

As shown in Fig. 1 of the drawings, the testing apparatus may comprise a stand 1, a test auxiliary reservoir 2, a dummy brake cylinder 3, a brake pipe 4, having a volume reservoir 5 connected therein, a supply reservoir 6, adapted to be charged from a suitable source through pipe 7 and a feed valve device 8, and a brake valve device 9.

The stand 1 may comprise a casting 10 having standards 11 adapted for securing the stand to a suitable support, a section 12 secured to the casting 10, a pair of clamping jaws 13, each fulcrumed on a pin 14 working within cam slot 15 and connected together at the rear ends by links 16, and a movable cylinder 17 pivotally connected to the links 16 and containing a stationary piston 18.

The cylinder 17 is provided with lugs 19 having apertures for guide bolts 20 and a coil spring 21 surrounds each guide bolt for yieldingly maintaining the cylinder in normal position.

Within the section 12 is mounted a piston 22, having a chamber 23 at one side open to a passage 24 leading to the seat of a rotary valve 25 adapted to be operated by a handle 26, and a chamber 27 at the opposite side having a passage 28 also leading to the seat of the rotary valve 25.

A barrel 29 is screwed into the piston 22 and contains a movable block 30 into which a contact rod 31 is screwed. A coil spring 32 is interposed between the block 30 and the rear end wall of the piston 22 and tends to maintain said block in its outer position.

The piston 22 is provided with a seating rib 33 adapted to engage a seat 34 when shifted to its innermost position and a coil spring 35, bearing against an adjustable nut 36, tends to maintain the piston 22 and the barrel 29 in their rearmost positions.

The auxiliary reservoir 2 is connected with a pipe 37, containing cock 38, with the casting 10 and the brake cylinder 3 by pipe 39 containing cocks 40 and 41. A pipe 42 leads from the supply reservoir 6 to the brake valve 9 and three pipe connections 43, 44, and 45, containing the respective cocks 46, 47, and 48, connect the supply pipe 42 with a pipe 49 leading to the auxiliary reservoir pipe 37, the cocks 46 and 47 being adapted to admit fluid to the auxiliary reservoir at different predetermined rates, through restricted openings, and the cock 48 at a comparatively unrestricted rate.

A branch pipe 50 containing a cock 51 leads from the brake pipe 4 to the casting 10 and cocks 52 and 53 are located in pipe 4 at opposite sides of the pipe 50.

A cock 54 in pipe 55 controls the admission and exhaust of fluid to and from the clamping cylinder 17 and cock 56 in branch pipe 57 is provided for cutting a supplemental reservoir in and out in testing the by-pass and graduated release features of a valve device.

A cock 58 communicating with pipe 49 is employed to exhaust fluid entirely from the auxiliary reservoir and a cock 59 also communicating with pipe 49 is provided with a restricted vent for blowing down the auxiliary reservoir pressure at a predetermined rate.

A pressure gage 60 is provided for showing the pressures in the auxiliary reservoir and the brake pipe, to which the gage is connected by the respective pipes 61 and 62, and another pressure gage 63 indicates the pressures in the supply reservoir and the brake cylinder, to which the gage is connected by the respective pipes 64 and 65.

While there are quite a number of tests required to determine whether or not a triple valve device is in proper condition to be put into service, and which can be made by means of the apparatus herein described, it is only deemed necessary to describe in detail the tests for triple valve piston packing ring leakage, service port capacity, and quick service port capacity.

*Piston packing ring leakage test.*

There are two possible sources of leakage around the triple valve piston packing ring, namely, between the outer surface of the ring and the cylinder walls and between the sides of the ring and the sides of the groove within which the ring is fitted.

If the ring is a loose fit in the groove, then when the piston is forced to service lap position, the ring will be pressed against the brake pipe side of the groove and from this position it is assumed that the ring will be forced with a lower differential than that required to move the piston. If the relative rise in pressure on the brake pipe side in releasing the brakes is made rapidly, the ring will be forced against the auxiliary reservoir side of the groove and the piston will be moved to release position. If, however, the differential is being obtained slowly, as would usually be the case on the rear cars of a long train, the ring will shift at the same differential as when obtained quickly, but since the rise in brake pipe pressure is slow, the pressure on the brake pipe side will fall by leakage past the ring, destroying the differential, so that the ring will remain at some position between the two walls of the groove and if the leakage is great enough, the triple valve piston cannot then be moved to release position.

Therefore, in order to properly test the triple valve for triple valve piston packing ring leakage, the test should be made under a slow rate of increase in the differential pressure which will be sufficient to move the ring but not high enough to move the ring to its opposite seat.

The minimum differential pressure should also be made higher than that required to insure the release of the triple valve in service, so that if it is possible for the ring to shift at all without moving the piston under the maximum differential to be encountered in service, it will be sure to show in the test.

In order to obtain a slow rate of increase in differential pressure on the piston, the differential is created by making the auxiliary reservoir volume relatively large and then reducing the auxiliary reservoir pressure, since it would require too small a hole were the brake pipe pressure to be increased in order to produce the desired differential slowly and by making the auxiliary reservoir volume large, a relatively large hole can be employed for venting fluid from the auxiliary reservoir without reducing the pressure too rapidly.

Since the differential to be created must be greater than that considered necessary to move the triple valve piston to release position, a stop device is provided for preventing the movement of the triple valve parts to release position when the differential pressure reaches a high point.

At the beginning of this test, cock 69 is opened so as to permit the charging of the reservoir 6 at the pressure for which the feed valve 8 may be adjusted, say eighty pounds.

The triple valve 66 to be tested having been placed in position against the clamping face of the device 1, the cock 54 is opened, so as to admit fluid from reservoir 6 to the cylinder 17, through pipe 55 and passage 67. The cylinder 17 is thus moved outwardly, actuating the jaws 13 to clamp the triple valve device firmly in position.

If the triple valve device is of the "piped" type, as shown, the cock 53 is now opened to connect the brake pipe 4 with the triple valve device. If the triple valve device is of the "pipeless" type, then the cock 51 is opened instead of cock 53, brake pipe pressure being supplied to the triple valve through a port in the seating face of the triple.

Cock 38 is now opened, so as to connect the slide valve chamber of the triple valve device with the auxiliary reservoir 2, cock 52 is opened to connect the brake pipe with the triple valve device, and cock 41 is opened to connect the brake cylinder 3 with the triple valve device.

Cock 40 is then opened so as to connect the brake cylinder with the atmosphere and thus permit the free exhaust of fluid supplied to the brake cylinder when the triple valve is moved to service position.

Cock 48 is opened, so as to connect the reservoir 6 with the auxiliary reservoir 2. This provides for quickly charging the auxiliary reservoir and also increases the effective size of the auxiliary reservoir, so as to insure that a brake pipe reduction will move the triple valve device to service application position and facilitate the production of a slow rate of reduction in auxiliary reservoir pressure.

The brake valve 9 is now placed in position No. 1, in which a through port 69 in the rotary valve 70 registers with port 71 in the rotary valve seat, which leads to the brake pipe 4, as shown in Fig. 6 of the drawings. The brake pipe is then charged with fluid under pressure from reservoir 6.

The cock 69 is now closed, so that when a brake pipe reduction is made, the auxiliary reservoir pressure will be reduced, as otherwise the pressure in the auxiliary reservoir would be maintained by the supply through the feed valve 8.

Normally the handle 26 of the rotary valve 25 is in the position shown in Fig. 3 of the drawings, in which cavity 68 connects passage 24 with passage 28, so that the fluid pressures on opposite sides of the piston 22 are maintained equal, but at this point in the present test, the handle 26 is turned so as to connect a through port 72 in the rotary valve with passage 28 and since the rotary valve chamber is open to the supply reservoir 6 through pipe 73, the chamber 27 will be subject to the pressure in said reservoir.

The brake valve 9 is now placed in one of the positions 4, 5 or 6, so as to effect a reduction in brake pipe pressure at a service rate, corresponding with the size of the triple valve under test.

For venting fluid from the brake pipe at different rates, the rotary valve 70 is provided with a cavity 78 having a central opening 79 adapted to constantly register with an exhaust port 80 in the valve seat and port openings 74 to 77 inclusive of varying sizes adapted to register in the respective positions 4, 5, 6, and 7 with a port 81 in the seat leading to a cavity 82, open to the brake pipe.

The reduction thus produced in brake pipe pressure causes the movement of the triple valve piston to service application position and when the auxiliary reservoir pressure on the opposite side of the piston has been reduced by flow to the brake cylinder to a degree slightly less than the reduced brake pipe pressure, the piston moves back and laps the service supply port, in accordance with the usual operation of the triple valve device.

In order to operate the stop device, the cock 48 is closed to cut off the reservoir 6 from the auxiliary reservoir 2 and the cock 69 is then opened to charge the reservoir 6 up to the full pressure.

This pressure now being greater than the auxiliary reservoir pressure, acts in chamber 27 against the piston 22 and moves same outwardly, so that the stop rod 31 is brought into a position for holding the triple valve parts in the predetermined lap position.

In order to insure that both the brake pipe and auxiliary reservoir pressures are fully reduced to the same predetermined test degree, the brake valve 9 is again placed in position 4, and if necessary the cock 40 may be opened to bleed down the auxiliary reservoir pressure to this point.

The auxiliary reservoir and brake pipe pressures being reduced to the same predetermined pressure, and the triple valve parts being held in lap position by the stop rod 31, the auxiliary reservoir pressure is now reduced at a predetermined slow rate by opening cock 59.

The brake pipe pressure on the brake pipe side of the triple valve piston is bottled up and can only escape by leakage past the packing ring, as the auxiliary reservoir pressure is reduced, and the leakage will be indicated by the drop in pressure in the brake pipe as shown by the gage. If the ring is loose in its groove, the same will be shifted from its brake pipe seat and permit leakage from the brake pipe to the auxiliary reservoir and since the rate of increase in differential pressure is slow, the ring will only move out sufficiently to permit leakage, as the brake pipe volume is relatively small and will quickly equalize with the auxiliary reservoir pressure.

The auxiliary reservoir pressure is slowly reduced until a certain maximum differential is obtained which is fixed at a point higher than that required to insure the release of the triple in service and if the leakage during this application is not in excess of a predetermined rate then the packing ring is considered fit for service.

*Service port capacity test.*

To make this test, the cock 69 is opened to charge reservoir 6 and the brake pipe and auxiliary reservoir charged as in the previous test. The cock 40 is opened so as to connect the brake cylinder to the atmosphere and permit the exhaust of air supplied by the triple valve from the auxiliary reservoir through the service ports.

After the auxiliary reservoir is fully charged from the reservoir 6, the cock 69 is closed and during this test, the reservoir 6 is a part of the auxiliary reservoir volume.

The brake valve 9 is now placed in one of the positions 4, 5, or 6, so as to reduce the brake pipe pressure at a predetermined rate according to the size of the triple valve device which is being tested. The triple valve parts then move to service application position and fluid is vented from the auxiliary reservoir through the service ports of the triple to the atmosphere. If the service ports are of the proper size the auxiliary reservoir pressure will reduce at a rate corresponding with the rate of reduction in brake pipe pressure, but if the service ports are restricted, then the auxiliary reservoir pressure cannot escape at the desired rate and the brake pipe pressure will then reduce below the auxiliary reservoir pressure, causing movement of the triple valve to emergency position, which will then indicate that the service ports are restricted.

*Quick service port capacity test.*

The quick service ports of a triple valve device operate during the movement of the triple valve parts to service position for venting fluid from the brake pipe to the brake cylinder and in order to determine whether these ports are of the desired capacity, the cock 40 is first opened to connect the brake cylinder to the atmosphere and then the brake valve 9 is shifted to lap position and the cock 58 opened so as to permit flow of air from the auxiliary reservoir to the atmosphere. Since the triple valve device is now in release position, the brake pipe pressure will also reduce through the usual feed groove around the triple valve piston. When the auxiliary reservoir and brake pipe pressures have been reduced to a predetermined degree, the cock 58 is closed.

The rotary valve 25 is now turned to the position for supplying fluid from the reservoir 6 through port 72 to piston chamber 27 and piston 22 is operated so as to cause the stop rod 31 to shift the triple valve parts and close the feed groove around the triple valve piston.

One of the cocks 46 or 47 is now opened, dependent upon the size of the triple valve and fluid is admitted from the reservoir 6 to the auxiliary reservoir at a predetermined slow rate.

The triple valve parts are thereupon moved to quick service position and air will flow from the brake pipe through the usual quick service ports to the atmosphere by way of the brake cylinder which is open to the atmosphere through the open cock 40.

The rate at which the brake pipe pressure falls is now noted on the gage and this will show whether or not the quick service ports are of proper capacity.

The reductions of auxiliary reservoir and brake pipe pressures to a predetermined point and the feeding of air into the auxiliary reservoir at a slow rate insures that the condition of the triple valve slide valve under pressure and the build up of the differential pressure on the triple valve piston will be such as to prevent the triple valve parts from jumping beyond the quick service position.

The reason for moving the triple valve piston to close the feed groove by the operation of the piston stop device is to insure movement of the parts under the slow feed up of auxiliary reservoir pressure.

Having now described my invention, what I claim as new and desire to secure by Letters Patent, is:

1. The method of testing triple valves to determine leakage past the triple valve piston packing ring which consists in subjecting the triple valve to pressures analogous to auxiliary reservoir and brake pipe pressures effecting the movement of the triple valve to and holding same in service lap position, in then reducing the auxiliary reservoir pressure, and finally noting the drop in brake pipe pressure.

2. The method of testing triple valves to determine leakage past the triple valve piston packing ring which consists in subjecting the triple valve to pressures analogous to auxiliary reservoir and brake pipe pressures effecting the movement of the triple valve to and maintaining same in service lap position, in then reducing the auxiliary reservoir pressure at a predetermined slow rate, and finally noting the drop in brake pipe pressure.

3. The method of testing triple valves for leakage past the triple valve piston packing ring which consists in subjecting the triple valve piston to the opposing pressures of a pipe analogous to the brake pipe and a reservoir analogous to the auxiliary reservoir but of relatively large volume, then reducing the brake pipe pressure to effect the movement of the triple valve piston to service lap position, holding same in said position, then reducing the auxiliary reservoir pressure at a predetermined rate, and finally noting the drop in brake pipe pressure.

4. The method of testing triple valves for leakage past the triple valve piston packing ring which consists in subjecting the triple valve piston to the opposing pressures of a pipe analogous to the brake pipe and a reservoir analogous to the auxiliary reservoir but of relatively large volume, then reducing the brake pipe pressure to effect the movement of the triple valve piston to service lap position, then maintaining same in said position, then reducing the auxiliary reservoir pressure at a predetermined rate until the differential between the auxiliary reservoir and brake pipe pressures exceeds a predetermined differential fixed upon as necessary to effect the movement of the piston to release position in service, and finally noting the drop in brake pipe pressure.

5. The method of testing triple valves for leakage past the triple valve piston packing ring which consists in subjecting the triple valve piston to the opposing pressures of a pipe analogous to the brake pipe and a reservoir analogous to the auxiliary reservoir, in reducing the auxiliary reservoir pressure at a predetermined slow rate, while the triple valve piston is prevented from moving to release position, until the differential between the auxiliary reservoir and brake pipe pressures exceeds the differential for effecting the movement of the piston to release position in service, and finally noting the drop in brake pipe pressure.

6. In a triple valve testing apparatus, the combination with a brake pipe and auxiliary reservoir, of a stop device for preventing movement of the triple valve piston to release position upon reducing the auxiliary reservoir pressure to test the triple valve piston packing ring for leakage with the triple valve piston in service lap position.

7. The combination with a brake pipe and auxiliary reservoir adapted to be connected to opposite sides of a triple valve piston, of means for reducing the auxiliary reservoir pressure at a predetermined rate on the piston of a triple valve device, with the piston in service lap position, and a stop device for preventing movement of the piston from service lap to release position.

8. In a triple valve testing apparatus, the combination with an auxiliary reservoir and a supply reservoir, of a piston normally subject on opposite sides to auxiliary reservoir pressure, a stop carried by said piston for engaging the moving parts of the triple valve, and means for supplying fluid from the supply reservoir to one side of said piston to operate said stop.

In testimony whereof I have hereunto set my hand.

WALTER V. TURNER.

Copies of this patent may be obtained for five cents each, by addressing the "Commissioner of Patents, Washington, D. C."